(12) United States Patent
Immel

(10) Patent No.: US 7,690,208 B2
(45) Date of Patent: Apr. 6, 2010

(54) LIQUID HYDROGEN TANK WITH A RELEASE PRESSURE ABOVE THE CRITICAL PRESSURE

(75) Inventor: Rainer Immel, Dexheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 601 days.

(21) Appl. No.: 11/198,203

(22) Filed: Aug. 5, 2005

(65) Prior Publication Data

US 2007/0029330 A1 Feb. 8, 2007

(51) Int. Cl.
F17C 7/04 (2006.01)

(52) U.S. Cl. .......................................... 62/48.1; 62/53.2

(58) Field of Classification Search ................. 137/583; 62/45.1, 53.2, 48.1; 429/22, 25, 34
See application file for complete search history.

(56) References Cited

U.S. PATENT DOCUMENTS

| | | | | |
|---|---|---|---|---|
| 2,453,766 A * | 11/1948 | Thayer | ........................ | 62/49.1 |
| 3,030,780 A * | 4/1962 | Loveday | ..................... | 62/48.3 |
| 3,123,981 A * | 3/1964 | Carney et al. | ................. | 62/48.1 |
| 3,272,238 A * | 9/1966 | Groppe | ....................... | 62/48.1 |
| 3,304,729 A * | 2/1967 | Chandler et al. | ............. | 62/48.3 |
| 3,652,431 A * | 3/1972 | Reynolds | ..................... | 205/338 |
| 3,782,128 A * | 1/1974 | Hampton et al. | ............. | 62/45.1 |
| 3,842,613 A * | 10/1974 | Becker | ........................ | 62/48.1 |
| 4,406,129 A * | 9/1983 | Mills | .......................... | 62/48.1 |
| 4,570,578 A * | 2/1986 | Peschka et al. | ............... | 62/48.1 |
| 5,408,957 A * | 4/1995 | Crowley | .................. | 123/27 GE |
| 5,579,646 A * | 12/1996 | Lee | .............................. | 62/48.1 |
| 6,321,837 B1 * | 11/2001 | Doering et al. | ............. | 166/248 |
| 6,544,400 B2 * | 4/2003 | Hockaday et al. | ........... | 205/338 |
| 6,786,245 B1 * | 9/2004 | Eichelberger et al. | .......... | 141/4 |
| 7,114,342 B2 * | 10/2006 | Oldham et al. | ............... | 62/48.1 |
| 7,144,555 B1 * | 12/2006 | Squires et al. | ............... | 422/168 |
| 7,165,408 B2 * | 1/2007 | Immel | ......................... | 62/48.1 |
| 7,413,585 B2 * | 8/2008 | Da Silva et al. | .............. | 62/45.1 |
| 2006/0027272 A1 * | 2/2006 | Tomlinson et al. | .......... | 137/881 |
| 2006/0199064 A1 * | 9/2006 | Arnold et al. | .................. | 429/34 |

OTHER PUBLICATIONS

Reynolds, William C. and Perkins, Henry C., Engineering Thermodynamics. McGraw-Hill, Inc., 1970, 1977. pp. 82-85, 643. TJ265. R38 1977.*

* cited by examiner

*Primary Examiner*—John Rivell

(57) ABSTRACT

A liquid hydrogen storage tank is provided with a boil-off release pressure above the critical pressure. The super critical pressure hydrogen storage tank has less hydrogen losses than a conventional tank even when used in vehicular applications and can be operated so as to provide zero hydrogen loss with reduced mandatory driving distances.

2 Claims, 5 Drawing Sheets

LIQUID HYDROGEN TANK WITH A RELEASE PRESSURE ABOVE THE CRITICAL PRESSURE

FIELD OF THE INVENTION

The present invention relates to hydrogen storage, and more particularly to a pressure release system for hydrogen storage.

BACKGROUND OF THE INVENTION

Fuel cell systems are increasingly used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

Hydrogen storage systems have been developed to provide hydrogen to the fuel cell stack. Internal combustion engines can also run on hydrogen. The hydrogen is generally stored in a storage vessel in gas and liquid phases under pressure and at low temperature. If the system pressure is too high, gaseous hydrogen is vented to atmosphere.

SUMMARY OF THE INVENTION

Accordingly, the present invention provides a pressure management system for a hydrogen storage system. The pressure management system includes a hydrogen regulator valve that regulates a hydrogen gas release flow from the hydrogen storage tank when a pressure within the hydrogen tank is greater than a threshold pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
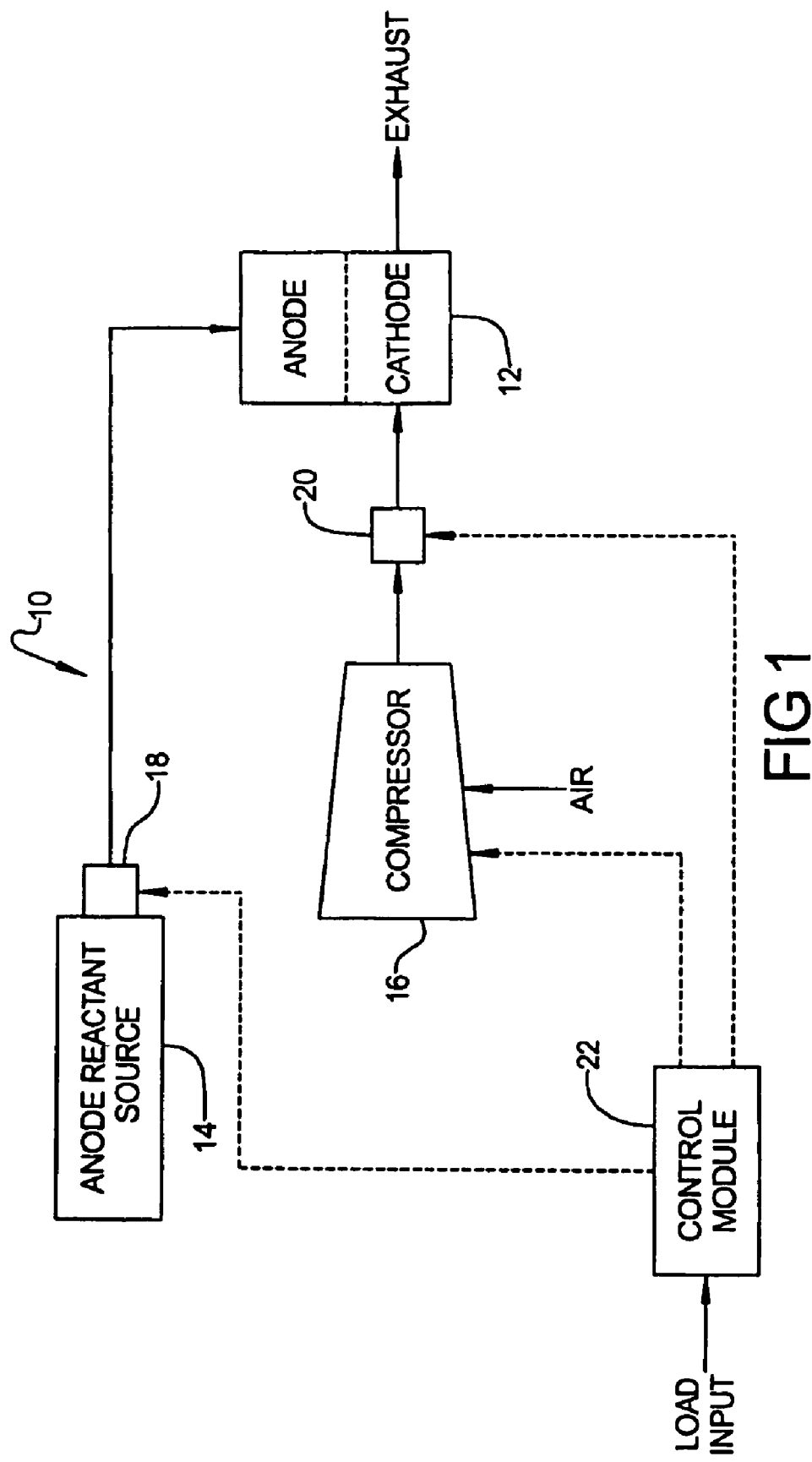
FIG. 1 is a schematic illustration of an exemplary fuel cell system including a hydrogen storage system according to the present invention.

Referring now to FIG. 1, an exemplary fuel cell system 10 is illustrated. The fuel cell system 10 includes a fuel cell stack 12, a hydrogen storage system 14 and a compressor 16. The hydrogen storage system 14 includes a pressure management system 18, which regulates a hydrogen flow to an anode side of the fuel cell stack 12. The pressure management system 18 also manages pressures within the hydrogen storage system 14, as discussed in detail below. The compressor 16 provides pressurized, oxygen-rich air to a cathode side of the fuel cell stack 12 through a regulator 20. Reactions between the hydrogen and oxygen within the fuel cell stack 12 generate electrical energy that is used to drive a load (not shown). A control module 22 regulates overall operation of the fuel cell system based on a load input and operating parameters of the fuel cell system. The load input indicates the desired electrical energy output from the fuel cell stack 12.

Figure 2:
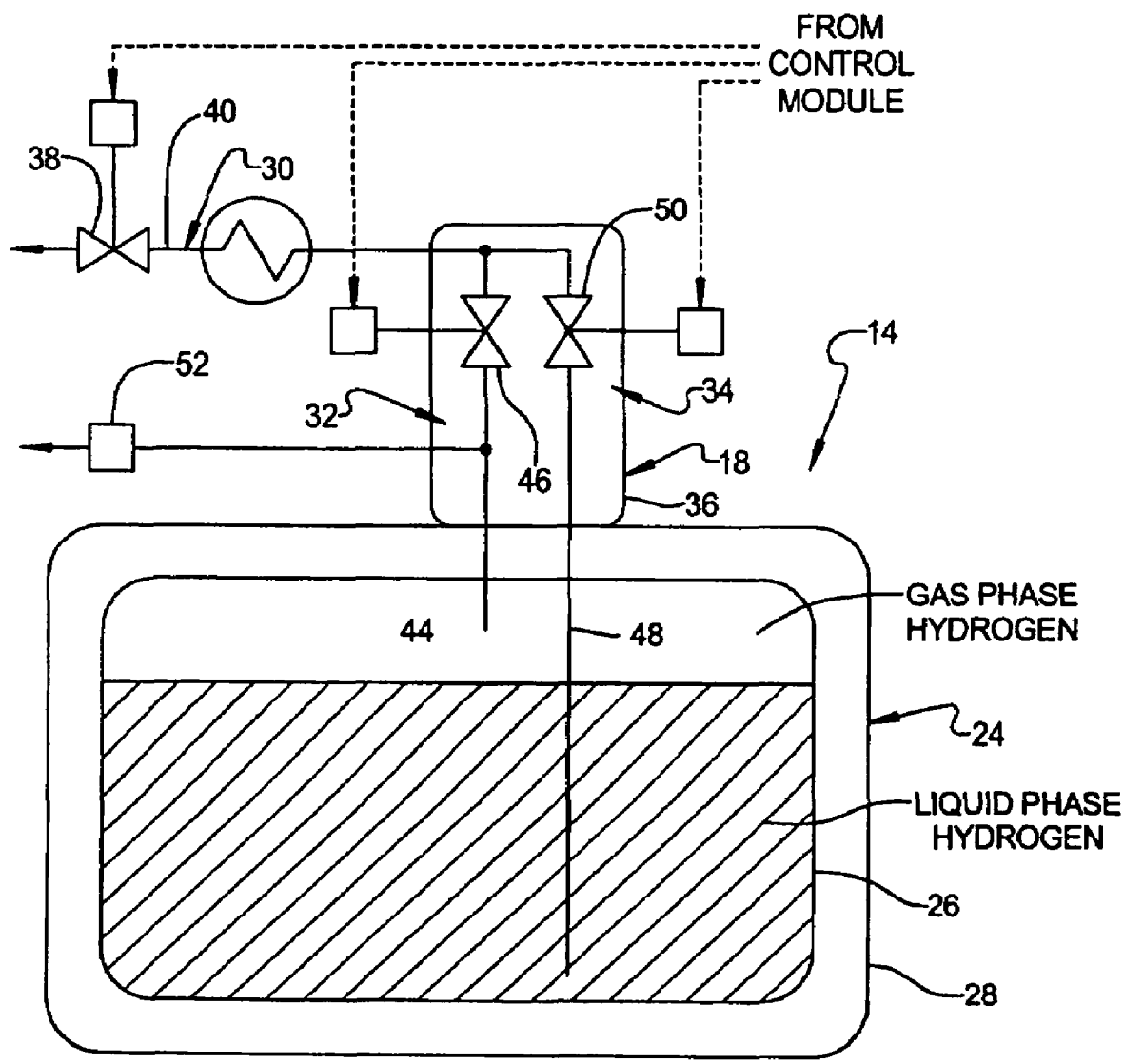
FIG. 2 is a schematic illustration of the hydrogen storage system including a pressure release system according to the present invention.
Figure 3:
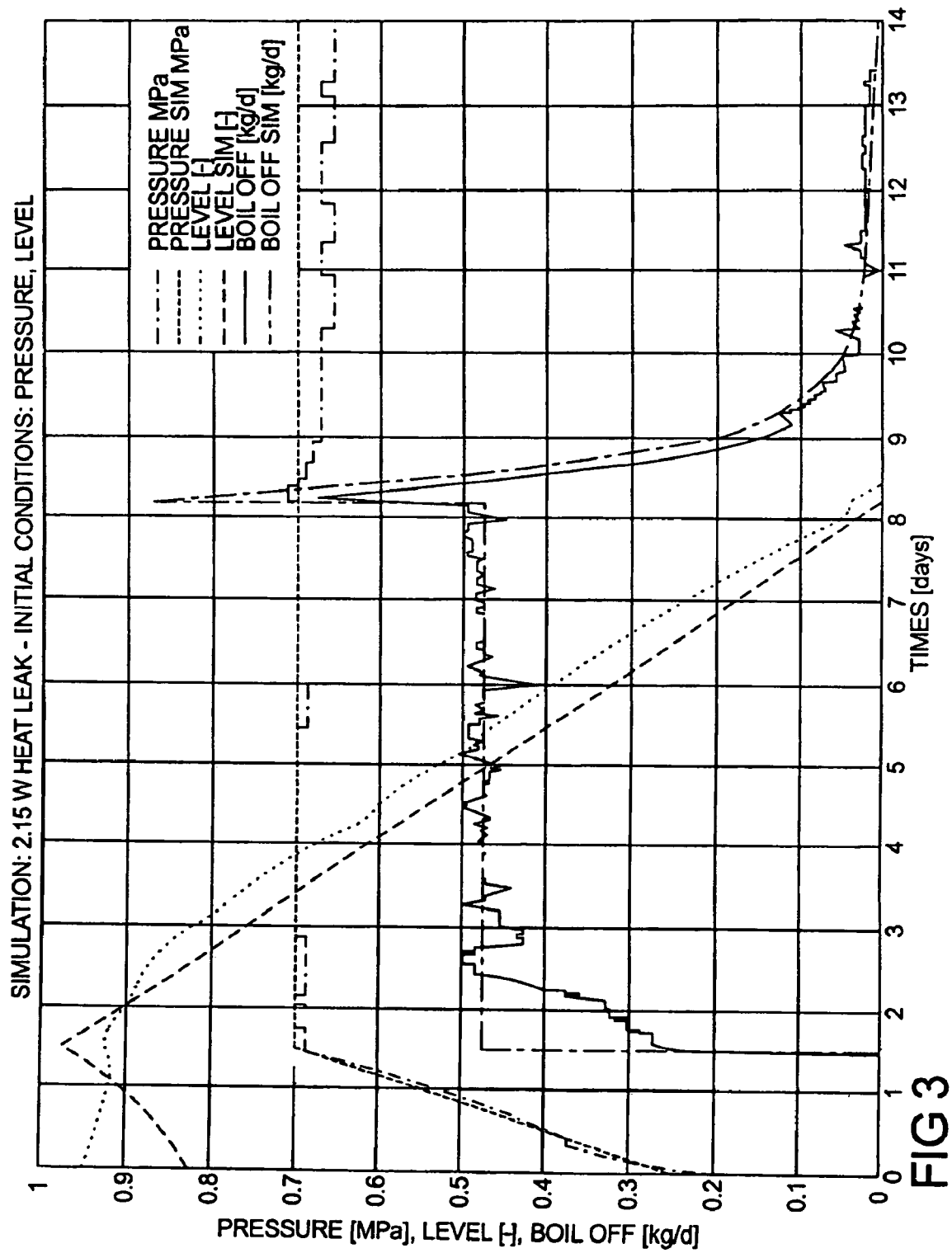
FIG. 3 is a graph illustrating a pressure change of a full hydrogen tank over a period of days until the tank is empty.

Referring now to FIG. 2, the hydrogen storage system 14 includes a storage vessel 24 that has an interior vessel structure 26 vacuum isolated within an exterior vessel structure 28. Multi-phase hydrogen is stored under pressure within the storage vessel 24. More specifically, gas phase and liquid phase hydrogen are stored within the storage vessel 24. The pressure within the storage vessel is generally maintained at a desired system pressure.

The system pressure is affected by the partial pressures of the liquid phase hydrogen and the gas phase hydrogen. Gas phase hydrogen is generally at the same total pressure as liquid phase hydrogen. If heat entry to the liquid and gas phase hydrogen within the storage vessel 24 increases, a portion of the liquid phase hydrogen converts to gas phase hydrogen. As a result, the system pressure increases. A significant pressure increase can occur, depending on the amount of liquid phase hydrogen that converts to gas phase hydrogen.

The pressure management system 18 regulates pressures within the hydrogen storage system 14 according to the present invention. The pressure management system 18 includes a hydrogen supply feed 30, a gas phase hydrogen feed 32 and a liquid phase hydrogen feed 34. The gas phase hydrogen feed 32 and the liquid phase hydrogen feed 34 are optionally enclosed within a vacuum isolation housing 36. The hydrogen supply feed 30 includes a shut-off valve 38 and a conduit 40 that extends into the housing 36. The shut-off valve 38 is operable in an open position and a closed position and is operated based on a control signal from the control module 22. In the open position, a hydrogen flow from the storage vessel 24 is enabled. In the closed position, the hydrogen flow is inhibited.

The gas phase hydrogen feed 32 includes a conduit 44 that extends into the gas phase hydrogen within the storage vessel 24 and a valve 46 that controls a gas phase hydrogen flow from the storage vessel 24 to the hydrogen supply feed 30. The liquid phase hydrogen feed 34 includes a conduit 48 that extends into the liquid phase hydrogen (represented by the shaded region in FIG. 2) and a valve 50 that regulates a liquid phase hydrogen flow from the storage vessel 24 to the hydrogen supply feed 30. The valves 46, 50 are regulated based on control signals generated by the control module 22. More specifically, when the shut-off valve 38 is in the open position and hydrogen is flowing from the hydrogen storage system 24, the valves 46,50 are regulated to supply the hydrogen at a desired pressure and to maintain the system pressure of the storage vessel 24. For example, if the system pressure is to be more drastically decreased, the valve 46 enables a gas phase hydrogen flow from the storage vessel 24. In other cases, the valve 50 enables a liquid phase hydrogen flow from the storage vessel 24. In such cases, the heat transfer device may be utilized to enable a state change from the liquid to the gas phase for supply to the fuel cell stack 12.

A regulator valve 52 is also included and is in fluid communication with the gas phase hydrogen feed 44. The regulator valve 52 prevents the system pressure of the storage vessel 24 from exceeding a threshold storage pressure. More specifically, the regulator valve 52 is designed to vent gas phase hydrogen to atmosphere if the system pressure achieves the threshold storage pressure. In this manner, the system pressure is reduced or maintained.

The current state of the technology is to store engineering gases at a temperature of below 100 K in special super-isolated tanks. In addition, specially designed liquid hydrogen storage tanks have also been provided for the operation of the fuel cell at 20-30 K. These tanks typically are held at a pressure below the critical pressure of the gases to be stored (for para-hydrogen that is 12.8 Bar). At this pressure, the stored hydrogen is characterized in two distinct physical states including liquid and gas (vapor, steam). As a rule, these two phases are held in thermodynamic balance with each other. That is, the same pressure and identical temperature. No hydrogen is removed from the tank at vehicle shut down.

Heat seeps into the super-isolated storage tank. This increase in temperature results in a corresponding rise in the pressure of the hydrogen in the tank. The pressure will increase until a specified operating pressure is reached. When this special pressure is reached, the regulator valve (also referred to as boil-off valve) is opened. The opening of the regulator valve prevents the over-pressurization of the hydrogen storage tank. This release of hydrogen to reduce or maintain internal tank pressure may be continuous or discontinuous, and is also referred to as boil-off. The rate or frequency of boil-off is dependent on the heat flow influencing the stored hydrogen, as well as other parameters (such as density, heat of vaporization). The heat stream is a function of the floating temperature slope. The warmer the medium in the tank, the less heat enters or is absorbed by the tank. The other parameter values, likewise, are temperature dependent. The higher the temperature, the higher the pressure, and the more frequent would be a boil-off incident. If the tank is over filled, the boil-off hydrogen can actually be in liquid form instead of a gaseous form. The release of liquid hydrogen during boil-off considerably increases hydrogen loss as compared to gaseous hydrogen boil-off. In addition, the release of liquid hydrogen poses a problem with the hydrogen emission management system (that is a type of combustor or dilutor to prevent the hydrogen from reaching the environment at dangerous concentrations). Such a hydrogen emission management system is not designed to accept large quantities of hydrogen. One solution to the problem is to limit the refilling of the tank in such a manner that it is not completely full. This has the obvious disadvantage that the entire volume of the tank is not utilized to store liquid hydrogen. Thereby a large amount of space is wasted on board the vehicle. Also, as part of the state of the technology is the use of chill shields, the chill shields are inserted in the vacuum space between the outer and inner shells of the super-isolated storage tank. They serve as radiation shields. During boil-off the cold hydrogen is directed to the shield. This reduces the heat in the super-isolated tank. Also, heat is removed from the tank during boil-off, further reducing the internal temperature of the tank. Contrary to the conventional hydrogen storage tanks, the present invention utilizes a liquid hydrogen tank with a boil-off pressure (i.e., threshold release pressure), of greater than 12.8 Bar. 12.8 Bar is the critical pressure for para-hydrogen. However, the increased boil-off pressure and corresponding linked temperature, are preferably not so large as to cause a greater evaporative loss during refueling as is experienced when refueling a conventional tank with a release pressure of 12.8 Bar or less.

The following discusses the operation of a hydrogen storage tank with a release pressure of greater than 12.8 Bar. The first simulation is provided in which a long time boil-off scenario can be used to characterize the behavior of a liquid hydrogen storage tank. A second simulation is a so-called "Park and Drive Cycle" (PADC) that gives a good impression on the performance of a liquid hydrogen storage tank when used in a vehicle that is in discontinuous operation.

Figure 4:
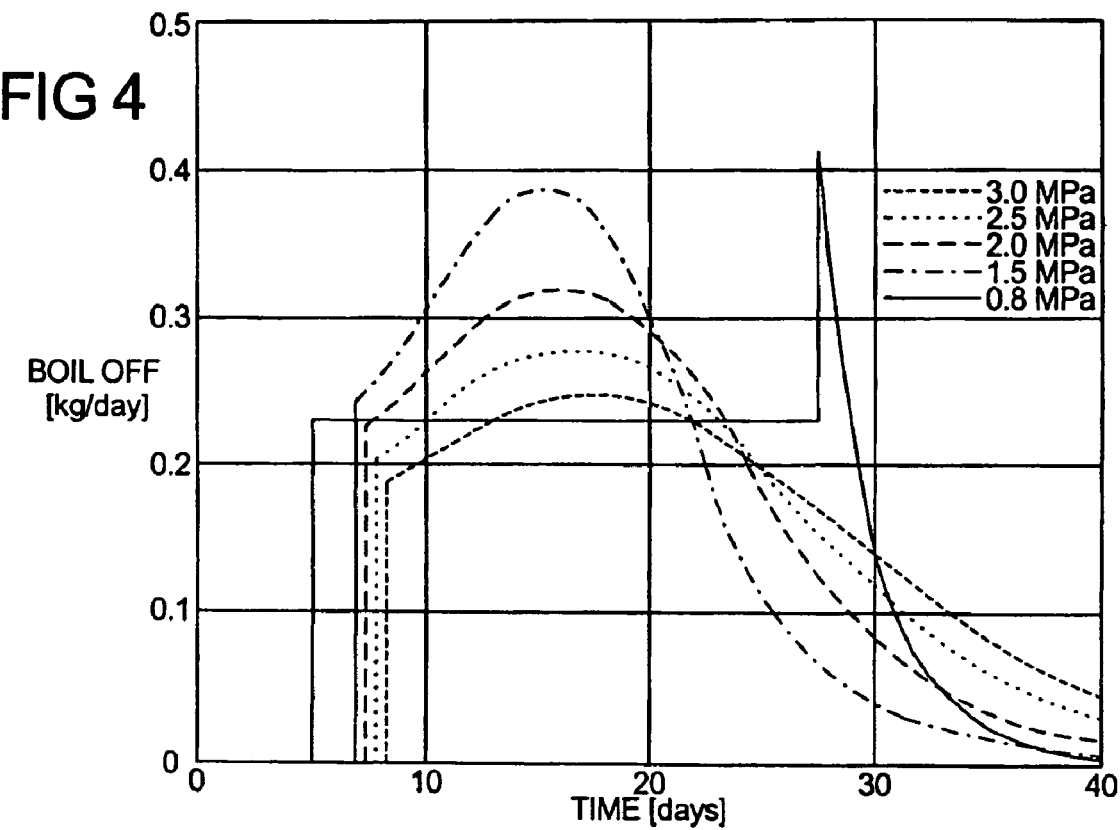
FIG. 4 is a graph illustrating the hydrogen boil-off rate as a function of time.

FIG. 4 shows the thermodynamic simulation of a filled liquid hydrogen tank that is left alone without any hydrogen removal. The focus of this simulation is the investigation of hydrogen losses due to boil-off with respect to time. The following assumptions have been made: real gas behavior (no ideal gas approximations); real material properties at cryogenic temperatures; tank volume equaling 120 liters; the tank material being stainless steal 316; the heat leak equaling 1 W at 20 K (less at higher temperatures due to heat transfer mechanism); inner tank mass equal to 25 kilograms (acting as thermal mass); initial volumetric filling level equal 80%; initial pressure equal 0.35 MPa; and boil-off pressures equaling 0.8; 1.5, 2.0, 2.5, 3.0 MPa (parameter variation).

FIG. 4 shows the boil-off rate as a function of time. The base case here is a conventional boil-off pressure of 0.8 MPa well below the critical pressure (1.28 MPa). Starting at an initial pressure of 0.35 MPa, the natural heat leak into the tank causes a pressure rise in the tank until the regulator valve opens to save the tank from over pressurization. This period referred to as an autonomy or dormancy time lasts about five days in this simulation. Then, the regulator valve releases a constant boil-off rate of about 0.22 kilograms per day until the tank is empty (at day 27). Then, there is a spike in the boil-off rate that is caused by the sudden absence of heat of vaporization causing the remaining gas to expand. After this spike, the boil-off rate rapidly decreases because there is only a small amount of gas left in the tank that gradually expands while warming up. If the boil-off pressure is raised slightly above the critical pressure, for example 1.5 MPa, two things change. First, the loss-free dormancy period is extended to about 7 days. Second, the boil-off rate is no longer constant in time, but instead has a shape of a hump that reaches its maximum when the tank is about half empty. If the boil-off pressure is varied further to 2.0, 2.5 and 3.0 MPa as shown in the graph of FIG. 4, the boil-off rate is still hump shaped but the maximum boil-off rate grows smaller.

Figure 5:
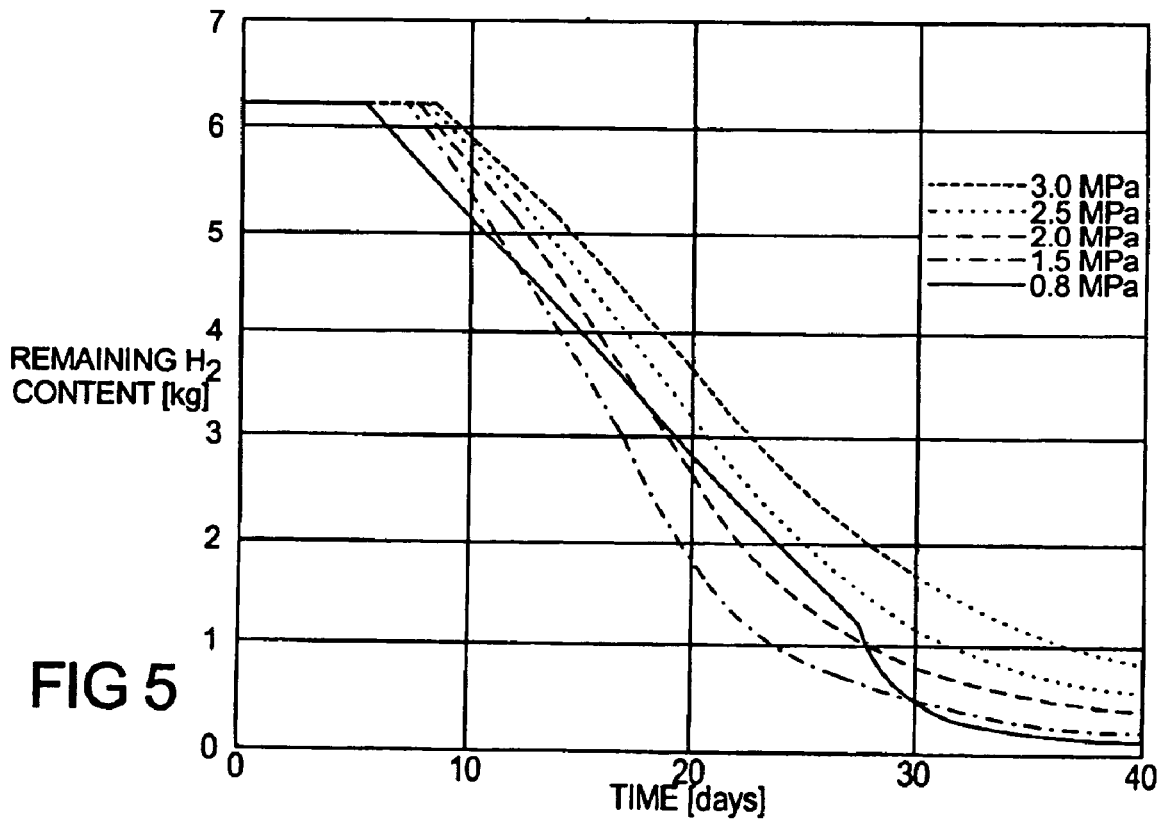
FIG. 5 is a graph illustrating the effect of the variation of boil-off set pressure on the remaining hydrogen in the tank.

FIG. 5 shows the effect of the variation of the boil-off set pressure on the remaining hydrogen mass in the tank. From FIG. 5, it can be seen that a boil-off pressure of 2.5 and 3.0

MPa always has a positive effect on the remaining hydrogen mass in the tank compared to the conventional base case 0.8 MPa. This is caused by both the increased loss-free autonomy time and by the lower effective boil-off rate.

The second simulation is directed to liquid hydrogen storage tanks for vehicular applications. The second simulation averages the losses that occur when a vehicle having an onboard fuel cell is operated for a brief time that is followed by an extended period of time without operation. Two "Park and Drive Cycles" (PADC) have been established that represent two different typical vehicle operator behaviors. The PADC 5/7 simulates a work day driver that drives a certain constant distance each working day, that is five days a week. During the weekend, the vehicle is not operated, so it is parked. The second cycle, the PADC 2/7, represents the weekend driver. In this cycle the vehicle is only operated two days a week at a constant distance each day, there is no operation during the five remaining days each week.

Figure 6:
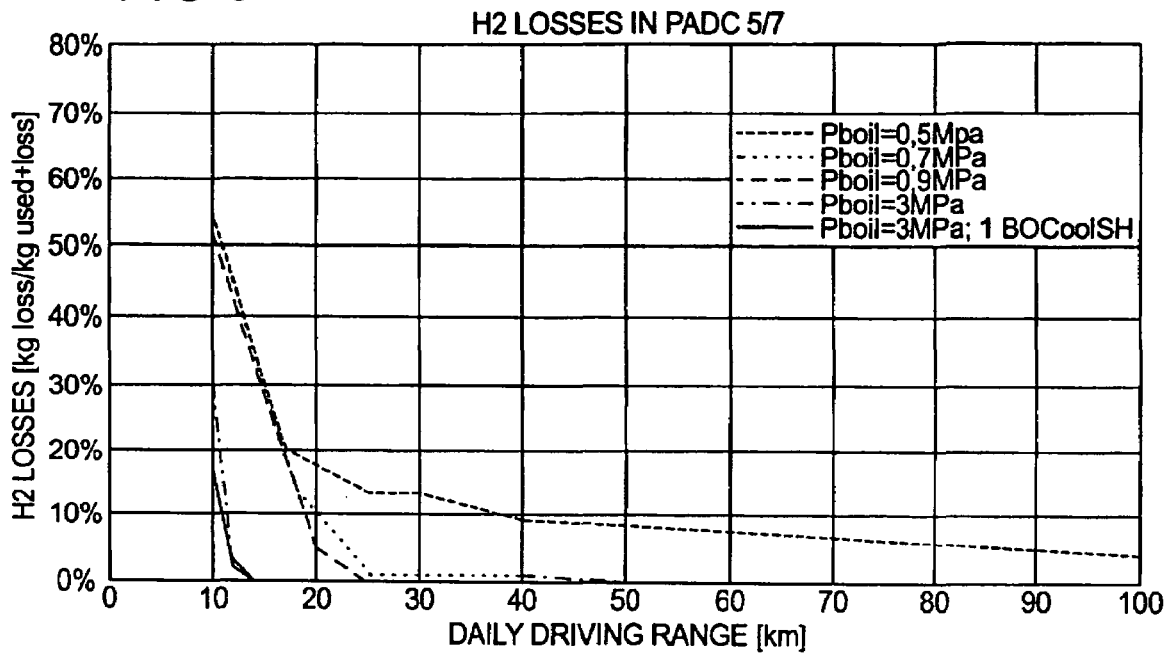
FIG. 6 is a graph illustrating hydrogen boil-off losses for a vehicle driven five workdays in a seven day week.

For the simulations a constant fuel economy (km/kgH$_2$) has been assumed with the tank parameters previously used for the long time boil-off simulation. The losses are averaged over a period of 8 weeks. An empty tank is automatically refilled. Results of the PADC 5/7 and PADC 2/7 simulations are displayed in FIGS. 6 and 7, respectively. For the work day driver in PADC 5/7 as illustrated in FIG. 6, it is sufficient to drive 25 kilometers per day to have zero hydrogen losses from the tank caused by boil-off if the boil-off pressure is 0.7 MPa or higher. In that case, the hydrogen evaporated during parking is consumed before boil-off pressure is even reached. If less hydrogen is consumed, the pressure will reach its limit during a weekend causing the regulator valve to open. The super critical hydrogen tank having a release pressure higher than the critical pressure reduces this loss free limit to 15 kilometers per day due to its extended loss free autonomy, which is a significant improvement. There is no significant gain if this super critical tank is equipped with a boil-off cooling shield that reduced the heat leak into the tank during the boil-off period.

Figure 7:
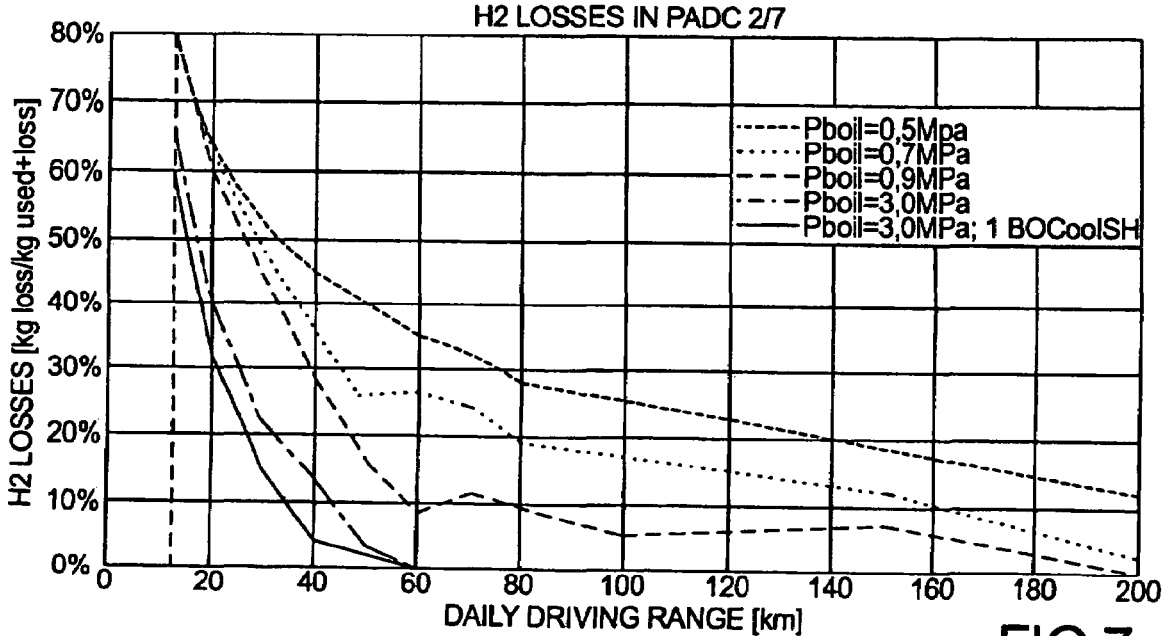
FIG. 7 is a graph illustrating hydrogen boil-off losses for a vehicle driven two days in a seven day week.

The weekend driver in PADC 2/7 will always suffer hydrogen losses caused by boil-off if the boil-off pressure is any of 0.5, 0.7 or 0.9 MPa, even if the very driving distance is as high as 200 kilometers during the weekend. This is because the dormancy of any of these systems is less than the 5 days of parking. In the long time boil-off simulation discussed above, the dormancy was 5 days at 0.8 MPa for a full tank, but the PADC is averaging over all possible filling levels. The dormancy is shorter for an emptier tank. In this case, the advantage of the super critical tank design having a pressure above 12.8 Bar (1.28 MPa) is even more convincing since there are no losses for the weekend driver with a storage tank having a release pressure of 3.0 MPa, if the daily driving distance is at least 60 kilometers on each of the two week ended days. An additional boil-off cooling shield can cut down the losses by approximately 10% for a daily driving range of less than 60 kilometers as illustrated in FIG. 7.

The hydrogen storage tank having a pressure above the critical pressure is distinguished from cryogenic high pressure tank concepts. In these concepts, the tank is typically designed for pressures ranging from 20 MPa to over 35 MPa. A major draw back of these tanks is the high temperature of the medium in the tank in combination with the large thermal mass of the inner vessel 26 in contact with the medium. Once this heavy inner tank 26 has obtained a high temperature (e.g. ambient temperature, 300 K), it is extremely difficult to cool it down to liquid hydrogen temperature (20-30 K), and a large amount of hydrogen is evaporated in the process of cooling down the inner tanks 26. More hydrogen losses occur during refueling if the tank pressure is at a high level. Hydrogen refueling stations can only handle pressures up to 1 MPa (10 Bar) which means the high pressure cryogenic tank needs to be depressurized in order to be able to start the refueling process. The hydrogen vented in the course of the depressurization is regarded as lost hydrogen from the vehicle point of view. Simulations with an assumed inner tank made of 100 kilograms stainless steel indicate the refueling losses illustrated in the following table wherein T$_0$ is the temperature of the hydrogen in the inner vessel before refueling. The tank pressure is assumed 0.4 MPa which is a typical refueling pressure for cryogenic liquid hydrogen. The simulated tank has a storage capacity of 5.4 kilograms of liquid hydrogen. This means for the initial temperatures 200 K and 300 K, the losses are greater than one tank filling. If the tank pressure is greater than 0.4 MPa the defueling losses would add to the losses listed in the table.

| T$_0$ (K) | H$_2$ Loss (kg) |
|---|---|
| 300 | 9.6 |
| 200 | 6.0 |
| 100 | 2.0 |
| <85 | 0 |

The super critical tank of the present invention has zero refueling losses in the "Park and Drive Cycle" (simulations).

A liquid hydrogen tank with a boil-off pressure above the critical pressure has been shown to have several advantages with respect to hydrogen losses compared to conventional tanks with a boil-off pressure below the critical point. In particular, the super critical tank has less hydrogen losses than the conventional tank. This is due to two factors, an extended loss free autonomy time and a reduced boil-off rate. In the long time boil-off scenario, the remaining hydrogen mass is the tank is always greater for a 3.0 MPa super critical tank compared to a 0.8 MPa conventional tank. In the "Park and Drive Cycle (PADC) 5/7 the zero loss required driving distances are reduced from 25 to 15 kilometers per day. In the PADC 2/7 drive cycle a super critical pressure hydrogen storage tank allows for zero loss operation at a driving distance of 60 kilometers per day or greater which is not possible at all with a conventional hydrogen storage tank which has a maximum pressure below the critical pressure of hydrogen. The super critical tank can also be filled to a high degree (up to 25% more) compared to a conventional liquid tank because the 95% maximum filling level rule no longer applies. This results in a higher storage density of the tank system, wherein a conventional tank system with a boil-off pressure of 0.8 MPa may only be filled to an average density of 55 g/l. The super critical tank may be filled up to the physical limit, the density of pure liquid hydrogen, which is 70 g/s. This is 25% more than the conventional tank.

The hydrogen storage tank having a boil-off pressure above the critical pressure also has advantages compared to high pressure cryogenic hydrogen storage tanks (having boil-off pressures of 20 MPa or greater) because the tank of the present invention has less weight and it has zero refueling losses even if the inner tank is warm. The weight is reduced because the design pressure per vessel and components is lower, which requires less wall thickness. Weight is a very important aspect for vehicle applications. The refueling losses are zero because both the thermal mass of the super critical inner tank and the heat capacity of the remaining warm gas are much smaller than those of the high pressure cryogenic vessel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liquid hydrogen storage system, comprising:
   a storage tank;
   a gas phase hydrogen feed including a conduit that extends into said storage tank and a valve that controls gas phase hydrogen flow from said tank and a liquid phase hydrogen feed including a conduit that extends into the storage tank and a valve that regulates liquid phase hydrogen flow;
   a control module for selectively actuating said gas phase valve and said liquid phase valve via control signals generated by said control module;
   an outlet passage communicating with an interior of said tank; and
   a regulator valve disposed in said outlet passage, said regulator valve having a threshold release pressure of greater than 12.8 Bar absolute pressure.

2. A method of storing liquid hydrogen, comprising the steps of:
   providing a storage tank, a gas phase hydrogen feed including a conduit that extends into said storage tank and a valve that controls gas phase hydrogen flow from said tank and a liquid phase hydrogen feed including a conduit that extends into the storage tank and a valve that regulates liquid phase hydrogen flow;
   a control module for selectively actuating said gas phase valve and said liquid phase valve via control signals generated by said control module;
   storing liquid phase and gas phase hydrogen in a said storage tank; and
   venting hydrogen gas to atmosphere from said storage tank through a regulating valve having a threshold release pressure of greater than 12.8 Bar absolute pressure.

* * * * *